(12) United States Patent
Logishetty (10) Patent No.: US 8,842,315 B2
(45) Date of Patent: Sep. 23, 2014

(54) PRINT SHOP MANAGEMENT METHOD FOR CUSTOMIZED PRINT JOB DUPLICATION

(75) Inventor: Bala Murali Krishna Logishetty, Westminster, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1031 days.

(21) Appl. No.: 12/891,748

(22) Filed: Sep. 27, 2010

(65) Prior Publication Data
US 2012/0075661 A1    Mar. 29, 2012

(51) Int. Cl.
G06K 15/00 (2006.01)
G06F 3/12 (2006.01)

(52) U.S. Cl.
CPC ............ *G06F 3/1204* (2013.01); *G06F 3/1253* (2013.01); *G06F 3/1285* (2013.01); *G06F 2206/1514* (2013.01); *G06F 3/1243* (2013.01)
USPC ........................................................ 358/1.15

(58) Field of Classification Search
None
See application file for complete search history.

(56) References Cited

U.S. PATENT DOCUMENTS

| 2004/0268352 A1* | 12/2004 | Honma | 718/100 |
| 2005/0146731 A1* | 7/2005 | Mitani | 358/1.1 |
| 2007/0030507 A1* | 2/2007 | Kaneko | 358/1.13 |

* cited by examiner

*Primary Examiner* — Marivelisse Santiago Cordero
*Assistant Examiner* — Mesfin Getaneh
(74) *Attorney, Agent, or Firm* — Chen Yoshimura LLP (57) ABSTRACT

A customized print job duplication method implemented in a print shop management system that includes a data processing apparatus having a non-transitory memory for storing a software program and a processor for executing the software program, wherein the software program includes program code configured to cause the data processing apparatus to execute a customized print job duplication process, which includes the steps of providing print job duplication options to allow selection of which sub-sections of a first print job will be duplicated, duplicating from the first print job the sub-sections selected for duplication, and creating a second print job with existing data and a set of settings to be applied to a second document processing job, the set including the settings duplicated from the first print job in the duplicated sub-sections.

21 Claims, 6 Drawing Sheets

```
Show All | Hide All
1 Job                                       ───230
☛Notes
▼Customer Info*
    First Name*
    [Murali]
    Last Name*
    [Logishetty]
    Email*
    [m.log@123.com]
  ▼Standard*
    Job Name*
    [        ]
    Due Date*
    [        ]
    Estimate
    ☐Estimate Required
  ▼Priority*
    Priority*
    ○ Normal
    ◉ Rush
  ▼Proof
    Proof
    ◉ No Proof Required
    ○ Soft Proof
    ○ Hard Proof
```

FIG. 5

```
2 Files                                     ───240
☛Notes
▼Submission*
    File Upload
    [🗎 Geminy_Precise.pdf   297KB  ▭▭▭▭  ✂ 🗑]
    [Upload]
    Delete Files
    ☐Delete Files After Use
    Delivery*
    ☑Upload
    ☐Email
    ☐Instant Messaging
    ☐Hardcopy
    ☐CD/DVD
    ☐Postal
    ☐Other
```

5 Shipping

☑ Notes

Select a location from your Address Book and drag it down to the Ship To table. To remove an address from the Ship To table, drag it back up to the Address Book. Click on a Ship To location to change its options.

Address Book

| Location |
|---|

To create an Address click on "new" or visit your profile

✱ New

Ship To: *

| Location | Options |
|---|---|

Drag the address you want to ship to here

6 Billing

☑ Notes

Choose your prefered billing method from the choices below

✱ New

Billing Method: *

*Billing Address*
*Cash on Delivery*
*Purchase Order*
*Cross Charge*
*Cash Pre-payment*
*Personal Check*
*Cashier's Check*
*Money Order*
*Bank/Wire Transfer*

Internal Services     📥Import  📤Export

Add Item

Item Name [      ] * Units [    ] * Icon [        ▼]
Description [                                ] [Upload]
                                    [Cancel] [Save]

🗑Delete ☐

| Item Name | Description | Units | Icon |
|---|---|---|---|
| Artwork | We can help create or edit your graphics and artwork | hour | ☑ ☐ |
| Spell Checking | We will double-check the spelling and grammar in your document | hour | ☑ ☐ |

FIG. 10

PRINT SHOP MANAGEMENT METHOD FOR CUSTOMIZED PRINT JOB DUPLICATION

BACKGROUND OF THE INVENTION

1. Field of the Invention

This invention relates to print job management system and method, and in particular, it relates to method implemented in print shops for customized print job duplication.

2. Description of Related Art

Print-on-demand (POD) document reproduction systems and programs have been developed and widely used to manage workflows and print jobs in an environment where a large number of print jobs are processed with multiple printers. Examples of such an environment are professional print shops and print/copy department at large organizations, where a variety of print requests, such as large-volume duplication and large document printing, needs to be processed and completed by utilizing multiple printers within a short turn-around time. These environments are collectively referred to as "print shops" in this application.

In a print shop management process, each printing job typically specifies a source file that electrically contains a document to be printed, and the required printing parameters such as the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differs in terms of these job parameters, a print shop utilizes multiple commercial grade printers, including black & white and color printers, each with often different limitations on available printer settings, such as the paper size, the paper type, resolution settings, etc. In addition, the print shop employs various finishing devices, such as collators, staplers, hole punchers, folding machines, binding machines, etc.

A print shop (or print job) management process is typically implemented by software or firmware programs executed by digital data processing apparatus such as a control computer or server connected to the printers in a print shop. The print shop management system submits each print job to one or more printers and finishing devices to produce the print job. The job submission may be done automatically by the print shop management system, semi-automatically with certain amount of operator intervention, or manually where decisions of how to submit the print job to appropriate printers or finishing devices are made by an operator.

The print shop management process and system organizes and manages print jobs using database entries, typically referred to as "job tickets". A job ticket specifies values of various print job parameters, and associates itself to the source file(s) to be printed. In one particular example, a job ticket may include a job ticket number, ticket name as well as the values of the following groups of various other job parameters: job information settings, basic settings (e.g., number of copies, orientation of paper, collate, offset printing, original paper size, output paper size, paper type, paper source, etc.), layout settings, cover sheet, finishing settings, inter-sheet settings, tab-paper settings, image quality settings, and customer information. A job ticket is associated with a source file (i.e. the document to be printed), and they collectively constitute a print job within the print shop management system.

Oftentimes a print job needs to be duplicated. In some print shop management programs a functionality for print job duplication is provided by having a print job copied in its entirety and assigned a new name. However, many times the duplicated print job needs to be done with modified settings. In these situations a user typically needs to open the new print job, move through the job's sub-categories, and modify individual settings one at a time. For simple jobs, this may not be a very time-consuming process and the simple duplication function may be quite useful. In other cases, however, simple duplication of a print job would not be a time-saving option for the user if the print job is more complicated. Nonetheless, any particular print job may have a certain amount of information that would be useful if it could be transferred to a new job order, because the user can save valuable time of re-entering duplicative data and can process the new print job much quicker.

Therefore, there is a need to provide a method to copy only the duplicative portion of a print job order while allowing the user to modify other portions of the new job order with new or changed parameters.

SUMMARY

The present invention is directed to a print shop management method that provides customized print job duplication, which substantially obviates one or more of the problems due to limitations and disadvantages of the related art.

An object of the present invention is to provide a customized print job duplication method for allowing a user to keep necessary redundant information and eliminate superfluous data from one job order to another and to modify the duplicated job order with new printing parameters and settings.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a print shop system for customized print job duplication, which includes the steps of: (a) providing print job duplication options to allow selection of which print job sub-sections of a first print job will be duplicated; (b) duplicating from the first print job the sub-sections selected for duplication; and (c) creating a second print job with existing print job data and a set of settings to be applied to a second document processing job, the set including the settings duplicated from the first print job in the duplicated sub-sections.

In another aspect, the present invention provides a print shop management system for customized print job duplication comprising a data processing apparatus having a non-transitory memory storing a customized print job duplication program and a processor executing the customized print job duplication program, wherein the customized print job duplication program includes program code configured to cause the data processing apparatus to execute a customized print job duplication process which comprises the steps of: (a) providing print job duplication options to allow selection of which print job sub-sections of a first print job will be duplicated; (b) duplicating from the first print job the sub-sections selected for duplication; and (c) creating a second print job with existing print job data and a set of settings to be applied to a second document processing job, the set including the settings duplicated from the first print job in the duplicated sub-sections.

In yet another aspect, the present invention provides a print shop management computer software program product having a computer readable program code embedded in a computer usable non-transitory storage medium for controlling a data processing apparatus, the computer readable program code configured to cause the data processing apparatus to execute a process for customized print job duplication by one or more printing devices connected to the data processing apparatus, the process comprising the steps of: (a) providing print job duplication options to allow selection of which print job sub-sections of a first print job will be duplicated; (b) duplicating from the first print job the sub-sections selected for duplication; and (c) creating a second print job with existing print job data and a set of settings to be applied to a second document processing job, the set including the settings duplicated from the first print job in the duplicated sub-sections and new or modified print job data.

In the exemplary embodiments of the customize print job duplication process of the present invention, the settings in the sub-sections that are not duplicated are newly inputted or modified by a user, and the second document processing job is created based on the settings duplicated from the first document processing job in the duplicated sub-sections and newly inputted or modified settings in the sub-sections that are not duplicated.

The customize print job duplication process may further include the steps of determining whether an existing print job needs to be duplicated, the step of providing a user interface (UI) indicating all sub-sections of the first print job are preselected and allowing deselection of any sub-section of the first print job that will not be duplicated, and the step of recording a user's selection pattern of print job sub-sections to be duplicated by counting the number of times a print job sub-section is selected for duplication so it can automatically offer to future print jobs the duplication of a print job sub-section if the number of times it has been selected for duplication reaches a predetermined threshold.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for customized print job duplication. The present invention method may be implemented by a computer software program that has program codes and instructions for implementing the steps of the present invention.

Figure 1:
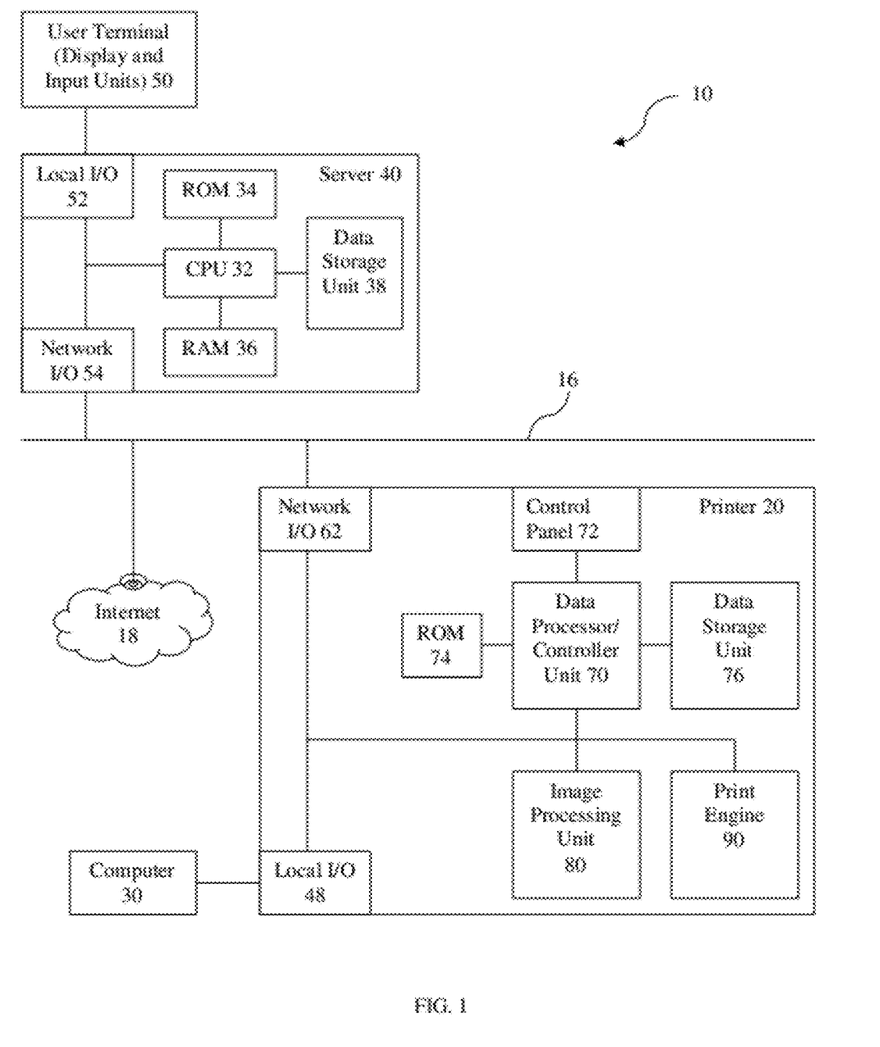
FIG. 1 schematically illustrates an exemplary print shop system where embodiments of the present invention may be implemented.

Referring to FIG. 1, there is shown a schematic block diagram showing an exemplary printing system set up or arrangement 10 in which embodiments of the present invention may be implemented. In the printing system set up or arrangement 10, a printer 20 may be directly attached to a local computer 30, or remotely connected to a server 40 through a data communication channel 16 which may be a wired or wireless network, a serial bus or a dedicated cable connected to the printer 20. Other devices (not shown) may also be connected to the computer 30 or network 16, such as scanners, finishing devices, etc., as part of the printing system set up or arrangement 10. In addition, remote clients (not shown) may also be connected to the server 40 or printer 20 via, for example, an open network such as the Internet 18. The print shop system 10 may also include a number of "off-line" (or "off-network") devices (not shown) that are not connected to the network 16, which devices may be any type of devices used in the print shop, such as finishing devices, prepress devices, etc.

The term "printer" used herein may be small desk-top printers typically seen in an office environment, or large printing systems used in print/copy departments at large organizations or professional print shops. It may also cover other similar image and document processing devices such as copiers or multifunction ("all-in-one") printers that also have copier, scanner and/or facsimile functions. The printer may be directly attached to a computer or server locally, or connected to a computer or server through a network remotely, where the computer or server are used to generate and send a print job to be processed by the printer through a printer driver which is a computer software program normally installed on the computer or server for converting the document or image to be printed to the form specific to the printer. The printer may have multiple paper trays to store paper of various sizes, color, and types. Further, the printer may be equipped with a sophisticated output sorting mechanism with multiple output trays to perform collate printing or other print finishing functions.

As shown in FIG. 1, the server 40 typically includes a central processor unit (CPU) 32 that controls the function and operation of the server 40 and execute computer instructions and programs that may be installed or saved on a read only memory (ROM) 34, a random access memory (RAM) 36, or a data storage unit 38 (such as a hard disc drive) coupled to the CPU 32. One or more user terminals 50 (each may have its display and input units) may be connected to the server 40 to enable print shop operators and/or users to interact with the server 40 and/or the rest of the print shop system. Alternatively the server may have its own integrated display and input units to enable print shop operators and/or users to interact with the server and/or the rest of the print shop system. The server typically has a local input/output (I/O) port 52 for connection with the user terminal 50, and a network I/O port 54 for connection to the data communication channel 16. Through the network 16 the server 40 is also connected to the open external network (such as the Internet) 18 so the server 40 may remotely receiving on-line print job submissions.

It is understood that the basic components of the computer 30 are similar to that of the server 40 and therefore will not be repeated in detail here. The server 30 is remotely connected to the printer 20 via a network I/O port 62 of the printer 20, whereas the computer 30 may be directly connected to the printer 10 via a local I/O port 64 of the printer 20.

As also shown in FIG. 1, the printer 20 typically has a network input/output (I/O) port 62 for connection with remote server 40, and a local I/O port 64 for connection with the local computer 30. The printer 20 also has a data processor or control unit 70, an image processing unit 80 and a print engine 90. The control unit 70 controls the other internal units of printer 20 and is connected to a control panel 72, an ROM (and/or an RAM) 74 and a data storage unit 76. The control panel 72 is accessible by a user and may include a display screen such as a liquid crystal display (LCD) display screen and user input means such as keys, buttons, touch screen, etc., for a user to communicate with and control the function and operation of printer 20.

While FIG. 1 shows a print shop environment, the present invention is not limited to any physical setting of a shop or network, and can be applied to a print shop system having a distributed setting where printers at different locations are connected to a server. In particular, it should be apparent that one or more of the components of the print shop system can communicate with the rest of the system via a virtual private network (VPN) or similar means through the Internet.

The print shop management software program, including the part for customized print job duplication functions that exemplarily implementing the present invention method and process, may be installed on the computer 30 or server 40 for managing a large number of print jobs that come into the print shop. As described earlier, the print job management software organizes and manages print jobs using job tickets. A main function of the print job management software is to analyze the job ticket requirements and submit each job to one or more printers and/or finishing devices to produce the print job.

When a print shop operator executes the print job management software program, the computer 30 or server 40 carries out various functions of the program, including customized duplication of print jobs implementing the method of the prevent invention. The print job management software program utilizes the feature of an UI (user interface) of the computer 30 or server 40, such as a touchscreen and/or a mouse and a keyboard, coupled with a display monitor.

The print shop management software program that implements the customized print job duplication functions of the present invention method may also be stored in the ROM 74 or storage 76 and executed by the controller 70 of the printer 20, utilizing the features and functions of the display panel 72 of the printer 20 for providing an UI to the operator or user of the printer 20, for customized duplication of print jobs.

In the context of this application, each of the devices in the print shop may be generally referred to as a "print job processing device" or "print job processing apparatus", and each of them performs some aspects of print job processing such as job intake, routing, prepress, printing, finishing, etc. Various print job processing devices or apparatus are controlled by various print job management programs, which may reside in memories and are executed by processors of the print job processing devices or of the computers or servers attached to or connected to the printers. Each print job management program has a print job database to store print jobs it processes. In this application, the terms "customized print job duplication apparatus" broadly refer to any computer, server, controller unit or controller, and/or data processing apparatus that can implement various features of embodiments of the present invention described below with appropriate hardware/software.

Figure 2:
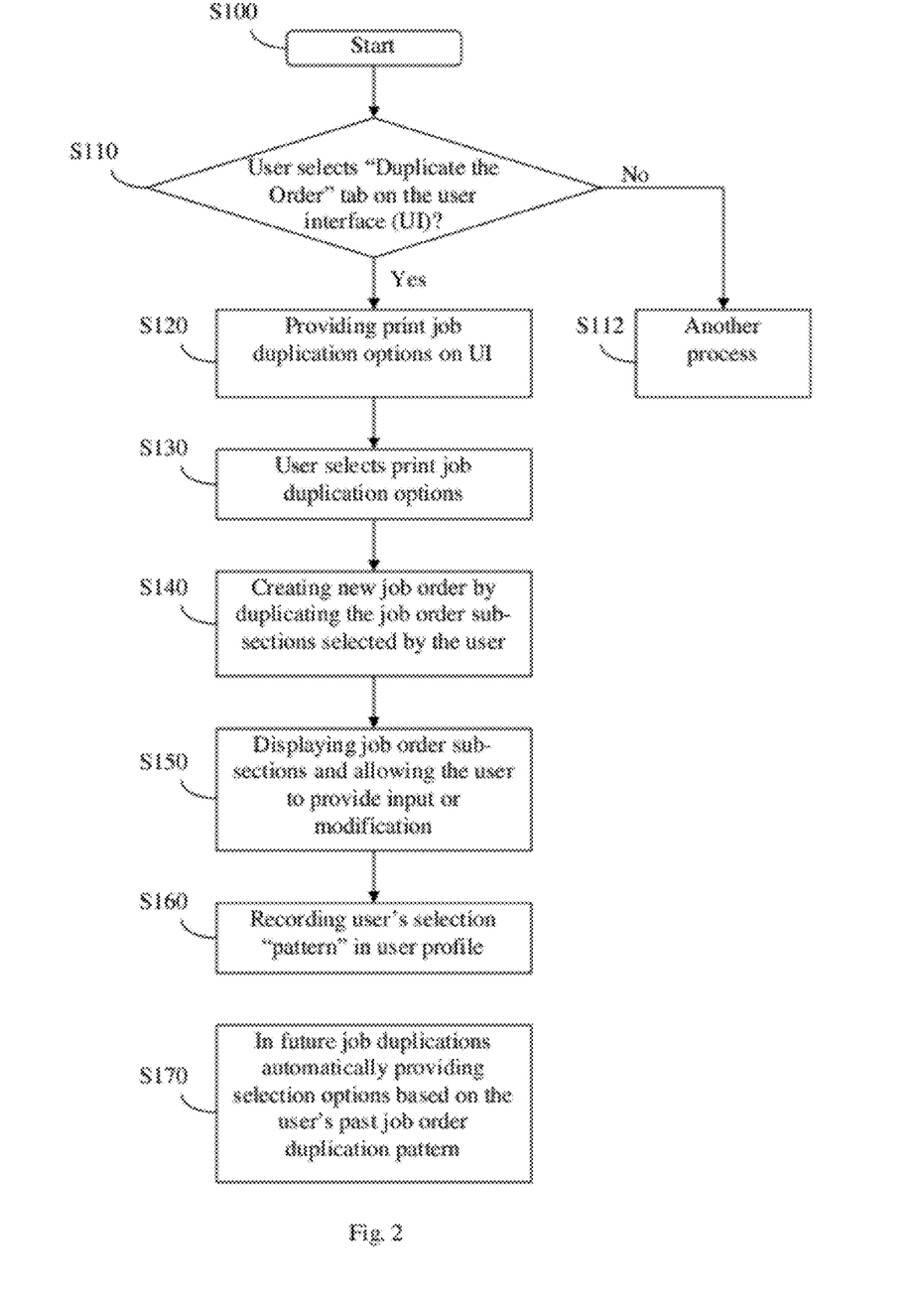
FIG. 2 illustrates a process implemented by a customized print job duplication program according to an embodiment of the present invention.
Figure 3:
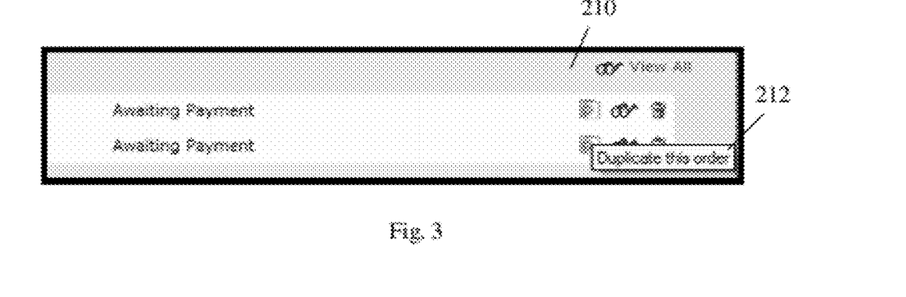
FIG. 3 shows a print job duplication user interface (UI) of the customized print job duplication program according to an embodiment of the present invention.

Referring to FIG. 2, there is illustrated an exemplary process implementing the customized print job duplication method of the present invention. At the start of the process (Step 100), it determines whether a new print job order needs to be generated by duplicating an existing print job order (Step 110). A user may initiate the print job duplication by selecting the "Duplicate the order" tab on an user interface (UI), so that the program can determine that an existing print job order will be duplicated and proceeds to provide print job duplication options (Step S120). If "Duplicate the order" tab on the UI is not selected at Step 110, then the program can determine that existing print job order will not be duplicated and proceeds to another process (Step 112). After the program determines that a print job is to be duplicated and provides print job duplication options at Step 120, the user may select print job duplication options (Step S130), based on which the program can create new print job order by duplicating the job order sub-sections selected by the user (Step S140), and the program will display the new job order sub-sections and allowing the user to provide input or modification (Step S150). The details of these steps are more apparent in conjunction with the description below of FIGS. 3 through 8.

In the print shop management program, a user can place a job order which will be moved to and stored in a monitoring location of the program where the user may review the job. As shown in an exemplary UI 210 of one embodiment of the present invention customized print job duplication program in FIG. 3, the user is presented with an option of duplicating the print job by clicking on the "Duplicate the order" tab 212. Once the user clicks on the "Duplicate the order" tab 212, the program will provide customizable print job duplication options to the user for the user to pick and choose for the duplicated print job.

Figure 4:
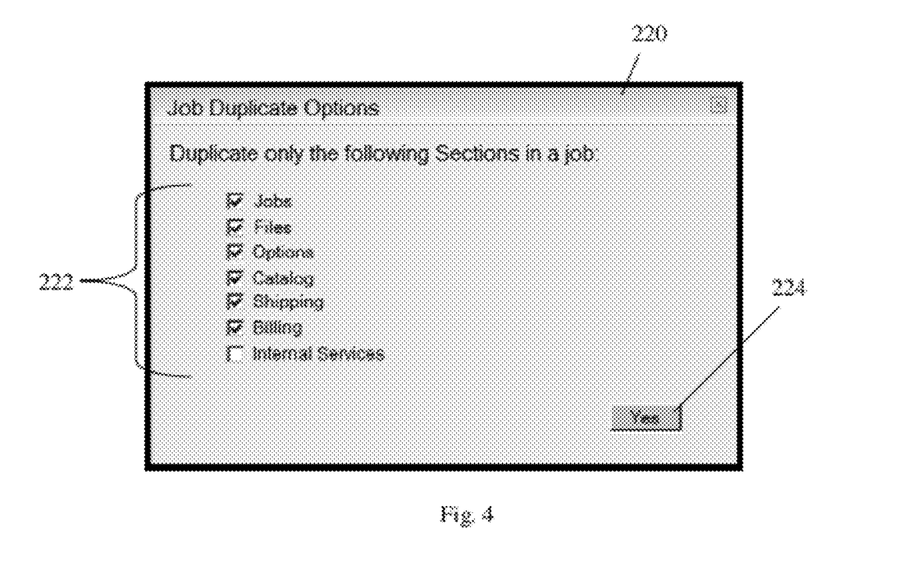
FIG. 4 shows a print job duplication options UI of the customized print job duplication program according to an embodiment of the present invention.

As shown in an exemplary UI 220 of one embodiment of the present invention customized print job duplication program in FIG. 4, the program asks the user to select which sub-sections 222 of the print job to duplicate. As an option, all the options may be "pre-selected" by default, and the user may deselect (uncheck) the options the user does not wish to have carried over into the new print job. This will save time for the user as most of the sub-sections are normally duplicated, as the user only needs to deselect or uncheck the sub-section (s) that often involves many changes in the job settings or parameters (e.g., the "internal services" sub-section)

Once the selection is made, the user may click the "Yes" tab 224 and the program creates a new (duplicative) print job by duplicating the print job order sub-sections selected by the user, and displaying print job order sub-sections and allowing the user to provide input or modification. These steps are further illustrated in FIGS. 5-10 which are exemplary UIs of one embodiment of the present invention customized print job duplication program.

Figure 5:
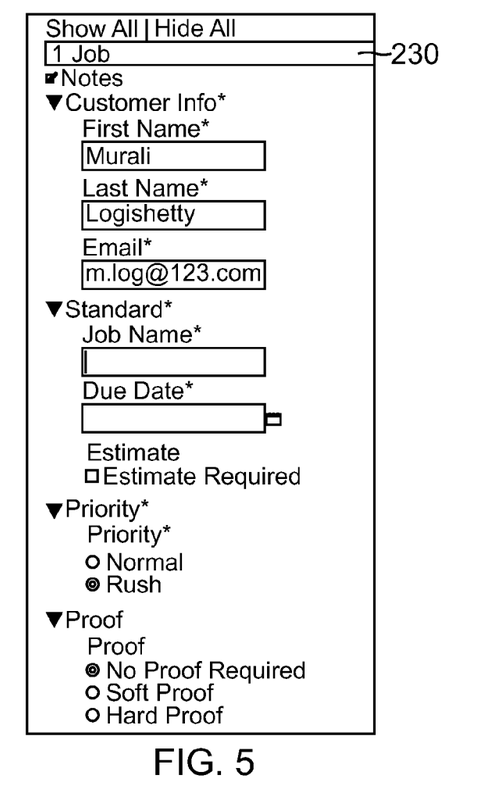
FIG. 5 shows a job sub-section UI of the customized print job duplication program according to an embodiment of the present invention.

As shown in FIG. 5 of the UI 230 for the "Job" sub-section, the mandatory customer information and job priority data are often not changed from job to job, and therefore can be populated with the data from the copied job order, saving the user the time of doing duplicative manual entries.

Figure 6:
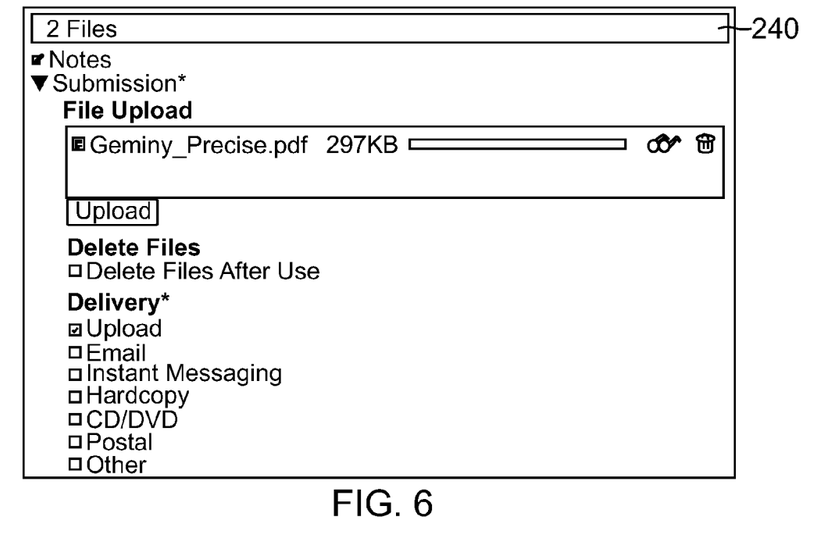
FIG. 6 shows a files sub-section UI of the customized print job duplication program according to an embodiment of the present invention.

As shown in FIG. 6 of the UI 240 for the "Files" sub-section, all values including the uploaded PDF file may be pre-populated as they often remain unchanged from job to job. This is especially useful when the same file is reprinted on a regular basis (e.g. bi-weekly, etc.).

Figure 7:
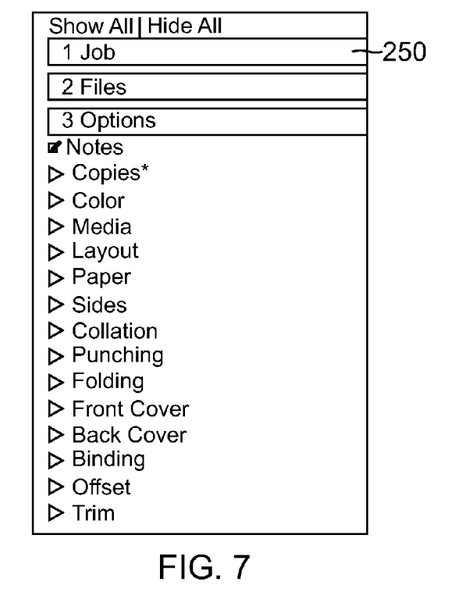
FIG. 7 shows an option sub-section UI of the customized print job duplication program according to an embodiment of the present invention.

As shown in FIG. 7 of the UI 250 for the "Options" sub-section, this sub-section can be customized for any combination of print job settings and/parameters, such as color settings, layout and finishing options, etc. The values displayed here may be very specific to a special type of order or to a specific type of printer, and having these complex values pre-populated or pre-loaded (by copying them over from an earlier job) can save the user much time and efforts. Conversely, turning off such values (when they are not required) can save the user much time, especially when the values in all the other sub-sections are required for the new job.

Figure 8:
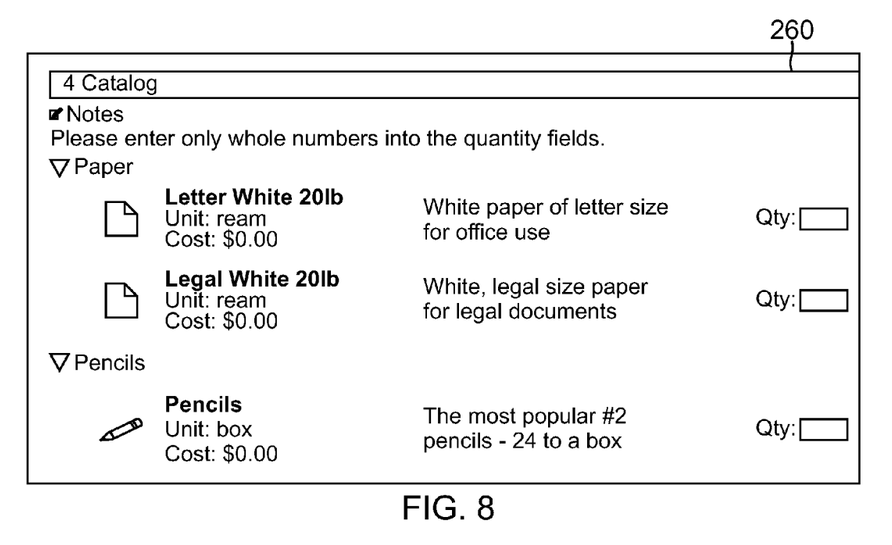
FIG. 8 shows a catalog sub-section UI of the customized print job duplication program according to an embodiment of the present invention.

As shown in FIG. 8 of the UI 260 for the "Catalog" sub-section, this section can also be customized and can contain hundreds of options, and having these complex values pre-loaded (by copying them from an earlier job) can save the user much time and effort. Again, on the other hand, turning off such values (when they are not required) can save the user much time, especially when the values in all the other sub-sections are required for the new job.

Figure 9:
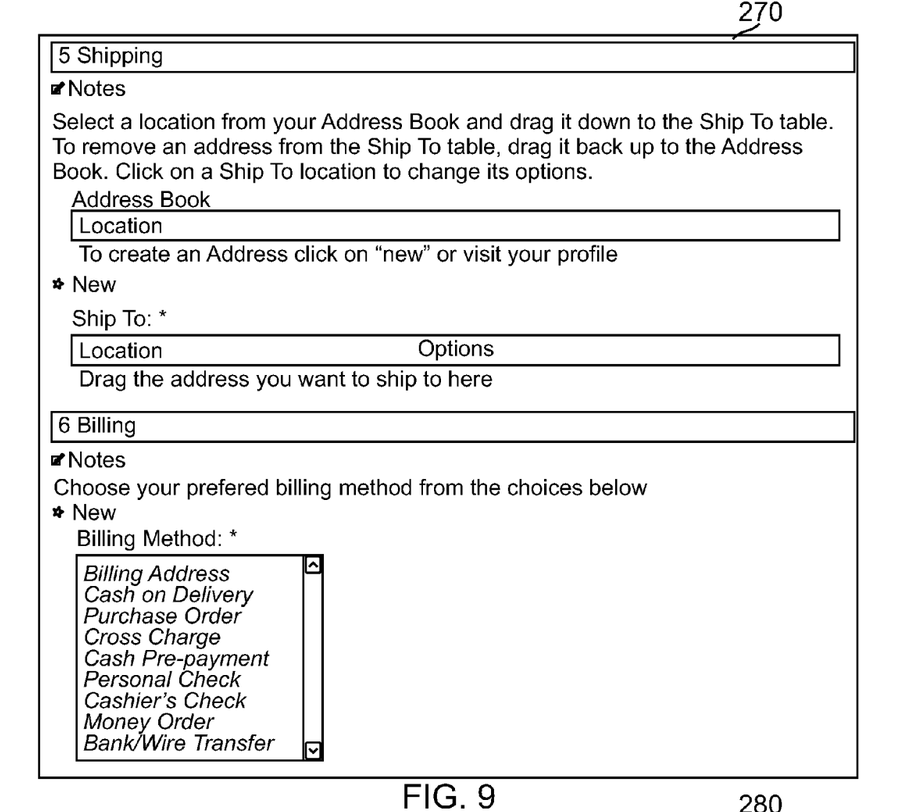
FIG. 9 shows a shipping and billing sub-section UI of the customized print job duplication program according to an embodiment of the present invention.

As shown in FIG. 9 of the UI 270 for the "Shipping" and "Billing" sub-sections, all of these values may be pre-populated, saving the user the time of having to manually file out both sub-sections. Of course, if everything on the order remains the same except the shipping or billing information, the user can chose to not copy such information from the previous job and speed up the order processing.

Figure 10:
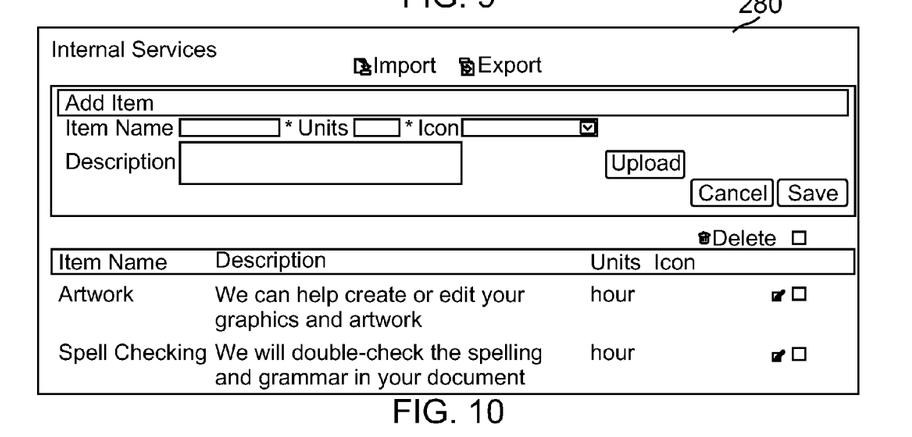
FIG. 10 shows an internal services sub-section UI of the customized print job duplication program according to an embodiment of the present invention.

As shown in FIG. 10 of the UI 280 for the "Internal Service" sub-section, these are values created after an order is placed and added to a print job, which can also be multiple, highly complex and time-consuming to add to a duplicated job. Again, carrying them over to the duplicated job saves time when they are required, or removing them from a job when they are not required, can save the user much time and efforts.

Once all print job sub-sections are completed either with pre-loaded data and settings duplicated from the previous print job or with newly added or modified data and settings for the new print job, a new (duplicated) print job is created by combining the duplicated sub-sections and the modified sub-sections. It is noted that it is not necessary for the user to go through all UIs shown in FIGS. 4-8. For example, the UIs for print job sub-sections selected (in step S130) to be duplicated may not need to be displayed, and only the UIs for print job sub-sections not selected (in step S130) to be duplicated need to be displayed for the user to make new input or modifications.

Referring back to FIG. 2, the exemplary process implementing the customized print job duplication method of the present invention may further include the steps of recording user's selection "pattern" in user profile (Step S160), such that in future job duplications the program can automatically provide selection options based on the user's past job order duplication pattern (Step S170). For example, the print job sub-sections which a user selects (in Step S130) every time in duplicating a job can be saved into a database which is unique to the user after the duplicated print job is submitted. By selecting the same print job sub-sections over and over for a predetermined number of times, the program may decide to make such selections for the user automatically at the time of duplicating a print job and present such selection to the user as a pre-loaded section options (in Step S120), which automated selection will closely resemble the user's "usually" job duplication pattern.

This automation may be performed based on a user-level print job duplication history. For example, each time a user selects the sub-sections and duplicates a job, the user's selections are saved to the user's database profile which keeps a counter which increases every time for the same selected sections. This way when the user duplicating a job, the program checks to see if the same selected sub-sections have reached a predetermined limit or threshold, and if so automatically selects the corresponding sub-sections for the user.

The customized print job duplication methods provided by embodiments of the present invention have many advantages. It greatly simplifies the print job duplication process by providing the user the options of copying over order information and job settings and parameters from a previous print job that remain unchanged, while allowing the user to only input or modify the order information and job settings and parameters that need to be changed for the new (duplicated) print job, thereby saving valuable user time and efforts. It also provides a "self-learning" feature which records a user's job duplication pattern and applies it to the new job duplication options that are automatically pre-loaded for the user's selection, further saving the user's time and efforts in duplicating a print job.

The exemplary embodiments of the present invention method and process described herein may be implemented in a print job management software program, without requiring special proprietary hardware or firmware.

Although examples of the UI displays used in the various procedures are shown and described in detail here (e.g. FIGS. 3-10), the invention is not limited to the specifics of these UI displays. The invention may be implemented using any forms of UI displays, as long as the UI display includes display means and input means that allow the user to specify various settings and issue commands to the programs. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "user interface (or UI) display" is used to generally mean any suitable screen display that displays information to the user and/or allows the user to input commands and other information, and is not limited to any specific form of display, and may include a series of consecutive displays.

The above described customized job duplication method is not limited to jobs in print application only, but can also be applied in other areas such as duplication of users, quotes, pricelist, and so on, in other applications. This invention of customized job duplication can also be expanded beyond print application and be applied to, e.g., e-mail submission of a job, wherein if a print is ordered through e-mail, and same tasks are replicated frequently, the present invention customized duplication process may be applied to such application.

For example, in case of the job relates to "scan to email", the following job settings can be exemplarily considered for the customized duplication process:

A sub-section for "scanning settings": this may include resolution setting (e.g., 200 dpi/300 dpi/400 dpi and 600 dpi, etc.), color depth setting (e.g., 4 bit/8 bit/16 bit, etc.), color setting (e.g., color and/or black and white), etc.;

A sub-section for "image processing settings": this may include file format setting (e.g., jpeg/tiff/giff/pdf/xps, etc.), image enhancing settings (e.g., selection of document attribute (text/image/graphics/mixture)), character recognition setting (e.g., on/off), etc.;

A sub-section for "email settings": this may include recipient settings, email formats settings (e.g., text/rtf/html), etc.

Then for a "scan to email" job that needs to be duplicated, the customized duplication process may prompt the user to select which sub-sections are to be duplicated and which are not, copy the data and settings over from the sub-sections that are duplicated, allow the user to add or modify data and settings in the sub-sections that are not duplicated, and create a duplicated "scan to email" job based on the data and settings in both the duplicated sub-sections and updated sub-sections.

The above example illustrates that the present invention customized print job duplication process can be easily adopted for use in other "document processing" (such as print, copy, scan, fax, email, etc.) job duplication applications. In such applications a document processing device may be a printer, a copier, a scanner, a fax machine or an email system.

It will be apparent to those skilled in the art that various modification and variations can be made in the customized print job duplication method and related apparatus of the present invention without departing from the spirit or scope of the invention. Thus, it is intended that the present invention cover modifications and variations that come within the scope of the appended claims and their equivalents.

What is claimed is:

1. A method implemented in a document processing management system for customized document processing job duplication, comprising the steps of:
    (a) providing document processing job duplication options to allow selection of which job sub-sections of a first document processing job will be duplicated;
    (b) duplicating from the first document processing job the sub-sections selected for duplication;
    (c) creating a set of settings to be applied to a second document processing job, the set including the settings duplicated from the first document processing job in the duplicated sub-sections; and
    (d) recording a user's selection pattern of document processing job sub-sections to be duplicated.

2. The method of claim 1, wherein the settings in the sub-sections that are not duplicated are newly inputted or modified by a user.

3. The method of claim 2, wherein the second document processing job is created based on the settings duplicated from the first document processing job in the duplicated sub-sections and newly inputted or modified settings in the sub-sections that are not duplicated.

4. The method of claim 1, further comprising the step of determining whether an existing document processing job needs to be duplicated.

5. The method of claim 1, wherein the step (b) further comprises the step of providing a user interface (UI) indicating all sub-sections of the first document processing job are pre-selected and allowing deselection of any sub-section of the first document processing job that will not be duplicated.

6. The method of claim 1, further comprising the step of counting the number of times a document processing job sub-section is selected for duplication.

7. The method of claim 6, further comprising the step of automatically offering to future document processing jobs the duplication of a document processing job sub-section if the number of times it has been selected for duplication reaches a predetermined threshold.

8. A document processing management system for customized document processing job duplication comprising a data processing apparatus having a non-transitory memory storing a customized document processing job duplication program and a processor executing the customized document processing job duplication program, wherein the customized document processing job duplication program includes program code configured to cause the data processing apparatus to execute a customized document processing job duplication process which comprises the steps of:
    (a) providing document processing job duplication options to allow selection of which job sub-sections of a first document processing job will be duplicated;
    (b) duplicating from the first document processing job the sub-sections selected for duplication;
    (c) creating a second document processing job with existing document processing job data and a set of settings to be applied to a second document processing job, the set including the settings duplicated from the first document processing job in the duplicated sub-sections; and
    (d) recording a user's selection pattern of document processing job sub-sections to be duplicated.

9. The system of claim 8, wherein the settings in the sub-sections that are not duplicated are newly inputted or modified by a user.

10. The system of claim 9, wherein the second document processing job is created based on the settings duplicated from the first document processing job in the duplicated sub-sections and newly inputted or modified settings in the sub-sections that are not duplicated.

11. The system of claim 8, wherein process further comprises the step of determining whether an existing document processing job needs to be duplicated.

12. The system of claim 8, wherein step (b) of the process further comprises the step of providing a user interface (UI) indicating all sub-sections of the first document processing job are pre-selected and allowing deselection of any sub-section of the first document processing job that will not be duplicated.

13. The system of claim 8, wherein the process further comprises the step of counting the number of times a document processing job sub-section is selected for duplication.

14. The system of claim 13, wherein the process further comprises the step of automatically offering to future document processing jobs the duplication of a document processing job sub-section if the number of times it has been selected for duplication reaches a predetermined threshold.

15. A document processing management computer software program product having a computer readable program code embedded in a computer usable non-transitory storage medium for controlling a data processing apparatus, the computer readable program code configured to cause the data processing apparatus to execute a process for customized document processing job duplication by one or more document processing devices connected to the data processing apparatus, the process comprising the steps of:
    (a) providing document processing job duplication options to allow selection of which sub-sections of a first document processing job will be duplicated;
    (b) duplicating from the first document processing job the sub-sections selected for duplication;
    (c) creating a second document processing job with existing document processing job data and a set of settings to be applied to a second document processing job, the set including the settings duplicated from the first document processing job in the duplicated sub-sections; and
    (d) recording a user's selection pattern of document processing job sub-sections to be duplicated.

16. The computer software program product of claim 15, wherein the settings in the sub-sections that are not duplicated are newly inputted or modified by a user.

17. The computer software program product of claim 16, wherein the second document processing job is created based on the settings duplicated from the first document processing job in the duplicated sub-sections and newly inputted or modified settings in the sub-sections that are not duplicated.

18. The computer software program product of claim 15, wherein process further comprises the step of determining whether an existing document processing job needs to be duplicated.

19. The computer software program product of claim 15, wherein step (b) of the process further comprises the step of providing a user interface (UI) indicating all sub-sections of the first document processing job are pre-selected and allowing deselection of any sub-section of the first document processing job that will not be duplicated.

20. The computer software program product of claim 15, wherein the process further comprises the step of counting the number of times a document processing job sub-section is selected for duplication.

21. The computer software program product of claim 20, wherein the process further comprises the step of automatically offering to future document processing jobs the duplication of a document processing job sub-section if the number of times it has been selected for duplication reaches a predetermined threshold.

\* \* \* \* \*